United States Patent
Boucher

(10) Patent No.: US 7,725,643 B1
(45) Date of Patent: May 25, 2010

(54) METHODS AND SYSTEMS FOR DETECTING AND AVOIDING AN ADDRESS DEPENDENCY BETWEEN TASKS

(75) Inventor: Michael L. Boucher, Lafayette, CO (US)

(73) Assignee: Oracle America, Inc., Redwood Shores, CA (US)

( * ) Notice: Subject to any disclaimer, the term of this patent is extended or adjusted under 35 U.S.C. 154(b) by 300 days.

(21) Appl. No.: 10/838,385

(22) Filed: May 4, 2004

(51) Int. Cl.
*G06F 12/02* (2006.01)

(52) U.S. Cl. .................. 711/102; 711/168; 711/173

(58) Field of Classification Search .......... 711/102, 711/168, 173
See application file for complete search history.

(56) References Cited

U.S. PATENT DOCUMENTS

| | | | | |
|---|---|---|---|---|
| 5,113,392 A | * | 5/1992 | Takiyasu et al. | 370/473 |
| 5,250,943 A | * | 10/1993 | Childs et al. | 340/2.21 |
| 5,386,515 A | * | 1/1995 | Martin et al. | 710/5 |
| 5,524,242 A | * | 6/1996 | Aida et al. | 717/149 |
| 7,020,738 B2 | * | 3/2006 | Neiger et al. | 711/6 |
| 2002/0178210 A1 | * | 11/2002 | Khare et al. | 709/107 |
| 2002/0191709 A1 | * | 12/2002 | Hunton | 375/295 |
| 2005/0086427 A1 | * | 4/2005 | Fozard et al. | 711/111 |

* cited by examiner

*Primary Examiner*—Sanjiv Shah
*Assistant Examiner*—Jae U Yu
(74) *Attorney, Agent, or Firm*—Marsh Fischmann & Breyfogle LLP; Kent A. Lembke; Thomas J. Burton

(57) ABSTRACT

Methods, systems, and articles of manufacture consistent with the present invention provide a optimization tool for avoiding an address dependency between tasks in a program. The tool determines whether two or more tasks of the program are dependent on at least one same address, which is associated with a first memory block. When it is determined that the two or more tasks of the program are dependant on the at least one same address, the tool allocates a second memory block and changes a read reference by at least one of the two or more tasks from the first memory block associated with the at least one same address to the second memory block.

28 Claims, 4 Drawing Sheets

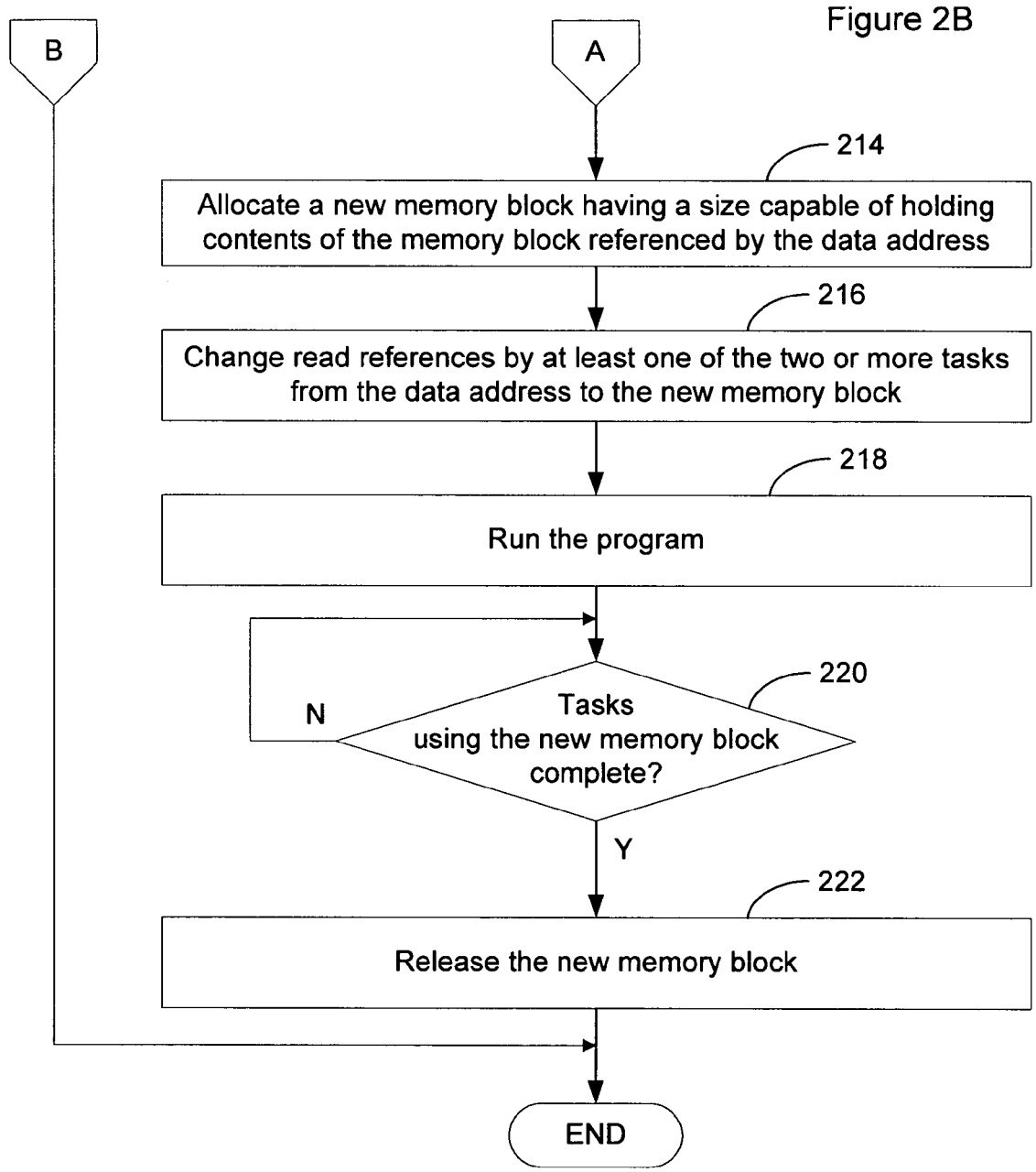

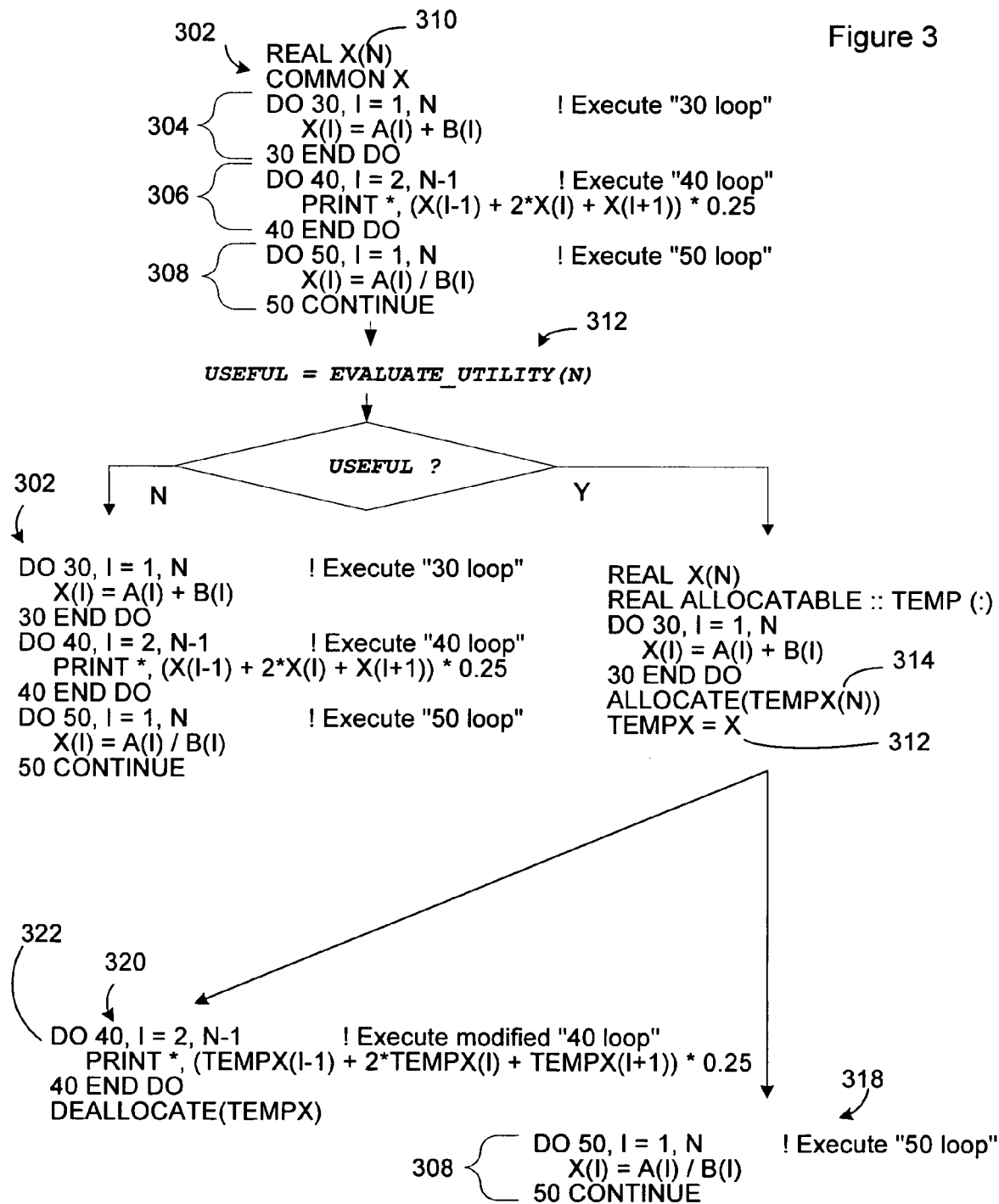

METHODS AND SYSTEMS FOR DETECTING AND AVOIDING AN ADDRESS DEPENDENCY BETWEEN TASKS

FIELD OF THE INVENTION

The present invention relates to methods and systems for improving the run-time performance of a program. In particular, methods and systems consistent with the present invention relate to detecting and avoiding an address dependency between tasks of a program.

BACKGROUND OF THE INVENTION

One way to speed the execution of a program on a computer or data processing system is to divide its work into multiple threads or tasks and run those tasks concurrently on multiple processors. A general requirement for concurrent execution of two tasks is independence. Two tasks are independent if neither alters a machine state that the other is using. For example, if a first task reads from memory address X then the second task may not write to memory address X. However, a problem arises when the two tasks of a program are coded or programmed to depend on the same memory address X, which often impacts the performance of the program when the two tasks are executed serially or in parallel.

Typically, two tasks may be programmed or compiled to depend on a memory address in one of two ways. First, the two tasks may both be programmed to depend on the value stored in the memory address. For example, two tasks may use a single counter to count instances of a particular event. In that case, every task that operates on the counter depends, for its correct operation, on the value stored in the memory address that holds the counter. Thus, this first form of dependency between two tasks requires that the value be stored by a previous task before a subsequent task is able to correctly update the counter with a new event count.

Second, two tasks may both be programmed or compiled to depend on the memory address but not on the value in the memory address. For example, a particular task may require access to a scratch workspace located at the memory address X for intermediate results but those results may not depend on previous contents of the memory address X.

The two forms of dependence by two tasks on a memory address may be differentiated by observing when the value or contents of a memory address are alive and dead, and the operation that causes the contents to become dead. A value is said to be alive if it may still be used by the program, otherwise it is dead. If a particular value becomes dead as part of an operation that refers to its previous value then that is an example of the first form of dependence. The following code illustrates this:

```
REAL SCRATCH(N)      ! Create memory address array as SCRATCH
COMMON SCRATCH
DO 10, I = 2, N      ! Execute "10 loop"
   SCRATCH(I) = SCRATCH(I-1)/SCRATCH(I)
10 END DO
PRINT *, SCRATCH     ! Print the contents of SCRATCH
DO 20, I = 1, N      ! Execute "20 loop"
   SCRATCH(I) = 0.0
20 END DO
```

The "10 loop" task (or tasks if divided for parallel processing) is an example of the first form of dependence. Because the "10 loop" task refers to SCRATCH by name, it depends on the address of SCRATCH. However, the "10 loop" task also refers to a value that was stored in SCRATCH by a previous operation. The "20 loop" task (or tasks if divided for parallel processing) is an example of the second type of dependence. The "20 loop" task cannot proceed until the previous PRINT or WRITE task (e.g., a write of SCRATCH memory address values to an I/O device) is complete. But while the "20 loop" task depends on the availability of the address range referenced by SCRATCH, it does not depend on values contained in that address range. As a result of this second form of dependence, the "20 loop" cannot proceed until the WRITE task no longer depends on the address range referenced by SCRATCH.

A write to or read from to physical I/O devices is generally relatively slow. The low speed of an I/O device is often hidden from a program by copying data from its original location to a buffer in memory and then allowing the program to proceed before the data are committed to physical storage. This breaks the dependency on the address range by moving the data from SCRATCH as fast as it can be moved through memory. However, the large sizes of the data sets in many applications, notably large scientific applications, are often such that the sizes of the buffers is insufficient and the speed of a program is limited by the speed at which the buffer contents can be moved to the physical device.

Another way in which a program could free SCRATCH quickly would be to allocate a local buffer with an application-dependent size that would guarantee that the buffer is large enough to handle the entire SCRATCH array. Such code might look like this:

```
REAL SCRATCH(N), S2(N)   ! Create memory address arrays
                              SCRATCH and S2
COMMON SCRATCH
DO 10, I = 2, N          ! Execute "10 loop"
   SCRATCH(I) = SCRATCH(I-1)/SCRATCH(I)
10 END DO
DO 15, I = 1, N          ! Execute "15 loop"
   S2(I) = SCRATCH(I)
15 END DO
PRINT *, SCRATCH         ! Print the contents of SCRATCH
DO 20, I = 1, N          ! Execute "20 loop"
   SCRATCH(I) = 0.0
20 END DO
```

Now there is no dependence between the PRINT or WRITE task and the "20 loop" task, so they can be done in parallel. However, this complicates the code and only works well in environments in which there is a spare processor to do the WRITE. In single-processor systems or in systems in which all processors are busy doing other things, which is a common case, loop 15 represents nothing more than extra processing that wastes time and space. Also, if further parallelization is desired then it may become necessary to add still more complexity such as locks or semaphores on S2 to make sure that none of the tasks that wish to use S2 do not conflict with each other. Programs whose data sets are large enough to make it prohibitive to keep S2 around for a long time should also consider dynamically allocating S2, in which case complex code must be written to handle the problems of insufficient memory and all of the other problems arising from dynamic memory allocation.

Therefore, a need has long existed for a method and system that overcome the problems noted above and others previously experienced.

SUMMARY OF THE INVENTION

Methods, systems, and articles of manufacture consistent with the present invention provide a performance optimization tool to detect and avoid an address dependency between tasks in a program before execution of the tasks. The performance optimization tool is able to determine whether it is useful to avoid the dependency based on the availability of a processor to perform parallel processing of the dependent tasks, the availability of memory for holding a copy of the dependent address values, and cost to implement and manage parallel processing of the dependent tasks. Thus, the optimization tool improves the run-time performance of the program by avoiding the dependency, saving a significant amount of time and cost in executing the program without the optimization applied.

In accordance with methods consistent with the present invention, a method in a data processing system for avoiding an address dependency between two or more tasks in a program is provided. The method comprises: determining whether two or more tasks of the program are dependent on an address associated with a first memory block; when it is determined that the two or more tasks of the program are dependant on the at least one same address, allocating a second memory block; and changing a read reference by at least one of the two or more tasks from the first memory block associated with the at least one same address to the second memory block.

In accordance with articles of manufacture consistent with the present invention, a computer-readable medium containing instructions for controlling a data processing system to perform a method is provided. The method comprises: determining whether two or more tasks of the program are dependent on an address associated with a first memory block; when it is determined that the two or more tasks of the program are dependant on the at least one same address, allocating a second memory block; and changing a read reference by at least one of the two or more tasks from the first memory block associated with the at least one same address to the second memory block.

In accordance with systems consistent with the present invention, a data processing system is provided. The data processing system comprises: a memory device further comprising a optimization program that determines whether two or more tasks of the program are dependent on at least one same address, the at least one same address associated with a first memory block; when it is determined that the two or more tasks of the program are dependant on the at least one same address, allocates a second memory block; and changes a read reference by at least one of the two or more tasks from the first memory block associated with the at least one same address to the second memory block; and a processor that runs the optimization program.

In accordance with systems consistent with the present invention, a system is provided that comprises: means for determining whether two or more tasks of a program are dependent on at least one same address, the at least one same address associated with a first memory block; and means for allocating a second memory and changing a read reference by at least one of the two or more tasks from the first memory block associated with the at least one same address to the second memory block in response to determining that the two or more tasks of the program are dependant on the at least one same address.

The above-mentioned and other features, utilities, and advantages of the invention will become apparent from the following detailed description of the preferred embodiments of the invention together with the accompanying drawings.

Other systems, methods, features, and advantages of the invention will become apparent to one with skill in the art upon examination of the following figures and detailed description. It is intended that all such additional systems, methods, features, and advantages be included within this description, be within the scope of the invention, and be protected by the accompanying drawings.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

FIGS. 2A-2B depict a flow diagram illustrating an exemplary process performed by an optimization tool to detect and avoid an address dependency between tasks in a program; and FIG. 3 depicts a flow diagram illustrating steps corresponding to the process shown in FIGS. 2A-2B as performed by the optimization tool on an exemplary program.

DETAILED DESCRIPTION OF THE INVENTION

Reference will now be made in detail to an implementation consistent with the present invention as illustrated in the accompanying drawings. Wherever possible, the same reference numbers will be used throughout the drawings and the following description to refer to the same or like parts.

In accordance with methods, systems, and articles of manufacture consistent with the present invention, a performance optimization tool is provided for detecting and avoiding an address dependency between tasks in a program before execution of the tasks. The optimization tool is able to determine whether it is useful to avoid the dependency based on factors that include: the availability of one or more processors to perform in parallel one of the dependent tasks, the availability of memory for holding a copy of the dependent address values, and the time savings of parallel processing exceeding the time to implement and manage parallel processing of the dependent tasks. Thus, the optimization tool improves the run-time performance of the program by selectively avoiding the dependency, saving a significant amount of time and cost in executing the program without the optimization applied.

Figure 1:
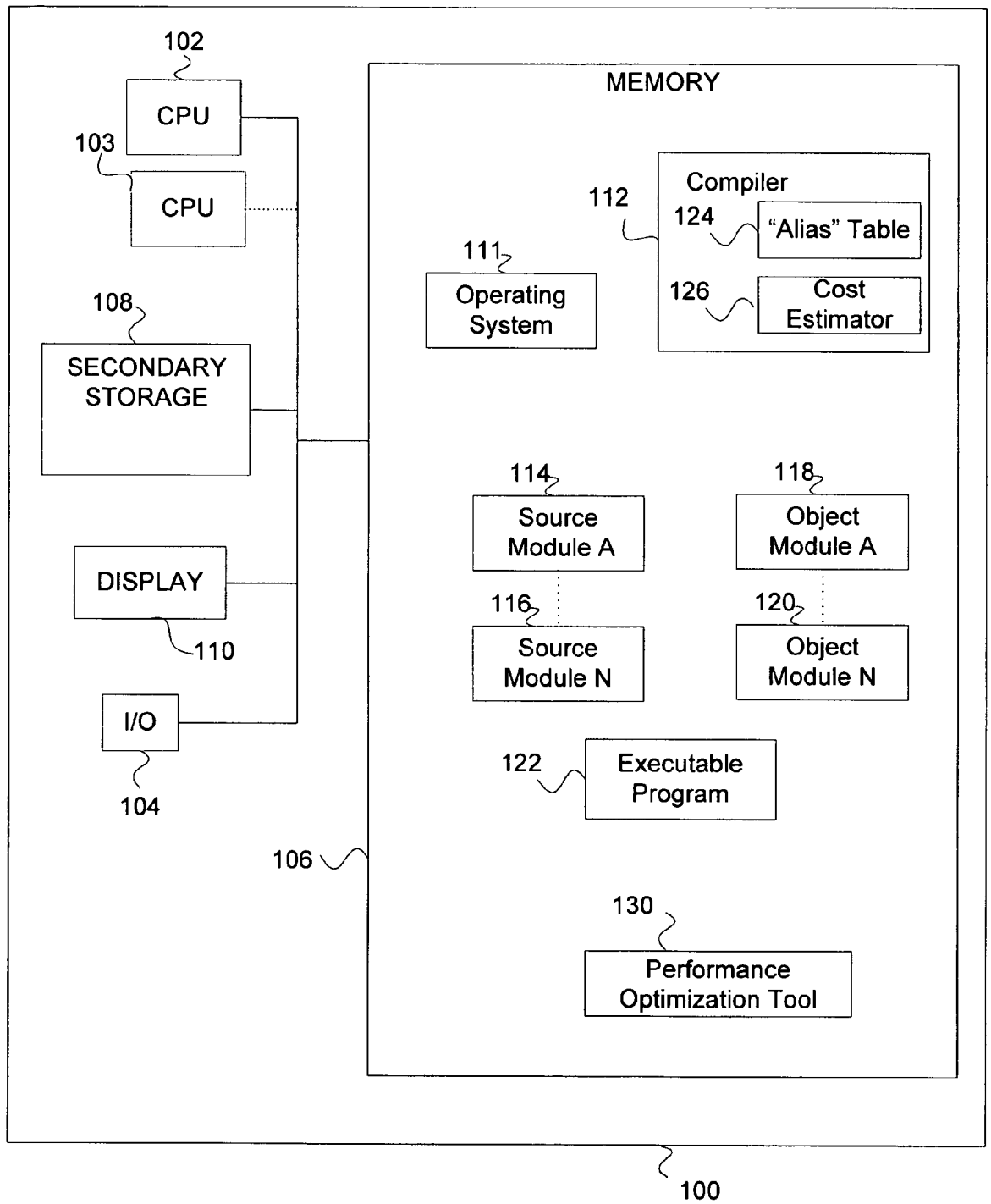
FIG. 1 depicts a block diagram of a data processing system suitable for use with methods and systems consistent with the present invention.

FIG. 1 depicts a block diagram of a data processing system 100 suitable for use with methods and systems consistent with the present invention. Data processing system 100 comprises a central processing unit (CPU) 102, an input output I/O unit 104, a memory 106, a secondary storage device 108, and a video display 110. Data processing system 100 may further comprise standard input devices such as a keyboard, a mouse or a speech processing means (each not illustrated). Data processing system 100 may also include a second CPU 103 for parallel processing instructions of a program contained in memory 106 or secondary storage 108.

Memory 106 may contain an operating system 111 for managing the operation of applications or programs run using the processors 102 and 103. Memory 106 may also contain a compiler 112 and source code modules A-N (e.g., 114-116) translated by the compiler 112 to produce corresponding object code modules A-N (e.g., 118-120). The compiler 112 or a linker (not shown in figures) may link the object modules 118-120 to produce an application or executable program 122 to be run using one or more target processors, such as CPU 102 and 103.

The compiler 112 may be a static compiler, a dynamic compiler (such as a Sun Virtual Machine) that interprets source modules 114-116 at run-time for the target processor 102 or 103, or a combination of the two.

In one implementation, the compiler 112 may be a Sun C++ Compiler or other compiler that is operably configured to produce an "alias table" 124 when producing the program 122. The compiler 112 detects and identifies in the "alias table" 124 whether a dependent relationship exists between two tasks of the program 122. In one implementation, the compiler 112 detects that a dependent relationship exists based on whether the two tasks reference the same memory address but not the contents of the address. In another implementation, the compiler 112 is operably configured to detect when two tasks reference the same memory address and to identify a corresponding relationship in the alias table 124 as either "does alias" (e.g., are dependent on the same memory address), "might alias" (e.g., might be dependent on the same memory, if the two tasks are run in parallel), or "does not alias" (e.g., are not dependent on the same memory address). One skilled in the art will appreciate that the compiler 112 may identify "does alias" and "might alias" using other nomenclature or symbols. Methods, systems, and articles of manufacture consistent with the present invention may treat "might alias" as equivalent to "does alias."

Compiler 112 may also include a cost estimator 126 and a performance optimization tool 130. In accordance with methods and systems consistent with the present invention, the optimization tool 130 causes the cost estimator 126 to calculate a cost associated with executing two tasks of the program 122 serially and a savings associated with executing the same two tasks of the program 122 in parallel. For example, assume the original code of program 122 includes the following "30 loop" task, "40 loop" task, and "50 loop" task, each of which depends on the memory block referenced by memory address X.

```
DO 30, I = 1, N                ! Execute "30 loop"
    X(I) = A(I) + B(I)
30 END DO
DO 40, I = 2, N-1              ! Execute "40 loop"
    PRINT *, (X(I-1) + 2*X(I) + X(I+1)) * 0.25
40 END DO
DO 50, I = 1, N                ! Execute "50 loop"
    X(I) = A(I)/B(I)
50 CONTINUE
```

In this example, the "30 loop" task, the "40 loop" task, and the "50 loop" are all dependent on memory address X (or the memory block referenced by address X) but the "50 loop" task overwrites memory address X without reference to the previous contents of memory address X. Accordingly, the optimization tool 130 and the cost estimator 126 are able to recognize that the "50 loop" task depends on the memory block referenced by memory address X but does not depend on the value(s) of memory address X.

In accordance with methods and systems consistent with the present invention, the cost estimator 126 or the optimization tool 130 may transform the original code of program 122 to the following transformed code to avoid the dependency between the "40 loop" task and the "50 loop" task on the memory address X:

```
DO 30, I = 1, N                ! Execute "30 loop"
    X(I) = A(I) + B(I)
30 END DO
ALLOCATE(TEMPX(N))
TEMPX = X
DO 40, I = 2, N-1              ! Execute modified "40 loop"
    PRINT *, (TEMPX(I-1) + 2*TEMIPX(I) + TEMPX(I+1)) * 0.25
40 END DO
DEALLOCATE(TEMPX)
DO 50, I = 1, N                ! Execute "50 loop"
    X(I) = A(I)/B(I)
50 CONTINUE
```

By copying the memory block referenced by memory address X to a temporary memory block (TEMP) or changing the referencing in the dependent task (e.g., the "50 loop" task) to the temporary memory block, the cost estimator 126 causes the "40 loop" task and the "50 loop" task of the transformed code of program 122 to be independent of one another so it is now possible for those two loops to execute in parallel with respect to each other.

In one embodiment, the cost estimator 126 or the optimization tool 130 estimates, at compile time, a first cost of executing the original code of the program 122 (e.g., the "40 loop" task, and the "50 loop" task) serially and compares that with a second cost of implementing and executing the transformed code (e.g., code to create TEMP memory block, code to change memory block references from address X to TEMP, the modified "40 loop" task, and the "50 loop" task) in parallel to determine a savings. The cost estimator 126 and the optimization tool 130 are able to recognize that the "30 loop" task would be performed serially before the "40 loop" task and before the "50 loop" task, and thus, need not be considered in the serial processing cost versus parallel processing savings comparison of the dependant tasks.

Once the first cost of executing the original code in serial and the second cost or savings of implementing and executing the transformed code is calculated, the compiler 112 then produces the code sequence (original code or transformed code) for the program 122 that it finds most cost-effective based on the savings calculated by the cost estimator 126 or the optimization tool 130. For example, the compiler 112 produces the original code of program 122 if the savings is zero or less (i.e., when the first cost to serially execute the original code is less than the second cost to implement and execute the transformed code in parallel). Alternatively, the compiler 112 produces the transformed code of program 122 if the savings is positive or the first cost to serially execute the original code is greater than the second cost to implement and execute the transformed code in parallel.

In one implementation, the cost estimator 126 or optimization tool 130 calculates the cost to execute a task by estimating various unknown parameters of an operation (such as the iteration count N in the addition operation of the "30 loop" task and in operations of other tasks of program 122) and then associating a time cost unit with each operation or action as shown below in Table I.

TABLE I

| TIME COST UNIT | ACTION |
| --- | --- |
| 1 | Add, subtract, or multiply arithmetic operation |
| 7 | Divide arithmetic operation |
| 100 | Allocate memory |
| 20 | Deallocate memory |
| 5 | Loop overhead |

TABLE I-continued

| TIME COST UNIT | ACTION |
|---|---|
| 3 | Load |
| 2 | Store |
| 1 | Branch |
| 35 | Output |

For example, using Table I, the cost estimator 126 or optimization tool 130 calculates the cost of executing the "40 loop" task and the "50 loop" task in series as follows with recognized costs demarcated in associated comment fields by "!":

! Loop overhead=5
DO 40, I=2, N−1
   ! Output+4 arithmetic ops+load=35+4*1+3=42
   PRINT *, (X(I−1)+2*X(I)+X(I+1))*0.25
! Branch=1
40 END DO
! Body of "40 loop"=(42+1); multiply by number of iterations to get total
!
! Loop overhead=5
DO 50, I=1, N
   ! Store+load*2+divide=2+3*2+7=15
   X(I)=A(I)/B(I)
! Branch=1
50 CONTINUE
! Body of loop 50=(15+1); multiply by number of iterations to get total Since the iteration count N in this example is unknown until run-time, the cost estimator 126 or optimization tool 130 estimates N before calculating the cost of processing the program 122 serially and the cost or savings of processing the program 124 in parallel. If the iteration count N is very small, the transformed code of program 122 may run more slowly in parallel than the original code of program 122 runs in series. To alleviate this problem, in one implementation, the cost estimator 126 or optimization tool 130 estimates the unknown parameters at run-time when the parameters (e.g., iteration count N) become known. In another implementation, the cost estimator 126 or optimization tool 130 calculates the break-even point for the unknown parameter, N, where the cost to implement and execute the transform code in parallel equals the cost to execute the original code of the program 122 serially. The cost estimator 126 or optimization tool 130 then inserts code to evaluate at run-time whether the original code in series or the transformed code in parallel should be used.

To illustrate methods and systems consistent with the present invention, it is assumed that the cost estimator 126 and the optimization tool 130 estimate the iteration count N to be 100 for the "40 loop" and "50 loop" in the original code and the transformed code of program 122. The cost estimator 126 or the optimization tool 130 is able to calculate a total cost in time to execute these loops in the original code in series as shown in Table II below.

TABLE II

| TIME COST UNIT | ACTION |
|---|---|
| 5 | "40 loop" task overhead |
| 4200 | 42 time cost units per iteration of "40 loop" multiplied by estimated 100 iterations for N |
| 5 | "50 loop" task overhead |
| 1600 | 16 time cost units per iteration of "50 loop" multiplied by estimated 100 iterations for N |
| 5810 | total cost units for executing "40 loop" and "50 loop" in series |

Using Table I, the cost estimator 126 or optimization tool 130 next calculates the cost of executing the "40 loop" task and the "50 loop" task in parallel as follows with recognized costs demarcated in associated comment fields by "!":

! Memory allocation=100
ALLOCATE(TEMPX(N))
! N loads and N stores=N*(3+2)
TEMPX=X
!
! Loop overhead=5
DO 40, I=2, N−1
   ! Output+4 arithmetic ops+load=35+4*1+3=42
   PRINT *, (TEMPX(I−1)+2*TEMPX(I)+TEMPX(I+1))*0.25
! Branch=1
40 END DO
! Body of loop 20=(48+1); multiply by number of iterations to get total
!
! Deallocate memory=20
DEALLOCATE(TEMPX)
!
! Loop overhead=5
DO 50, I=1, N
   ! Store+load*2+divide=2+3*2+7=15
   X(I)=A(I)/B(I)
! Branch=1
50 CONTINUE
! Body of loop 30=(1+1); multiply by number of iterations to get total The cost estimator 126 or the optimization tool 130 is then able to calculate, as shown in Table III, a total cost in time to implement and execute in parallel the modified "40 loop" task and the "50 loop" task of the transformed code for program 122.

TABLE III

| TIME COST UNIT | ACTION |
|---|---|
| 100 | allocate memory |
| 500 | copy X to TEMPX using an assumed size of 100 for N |
| 600 | Total time cost units to implement TEMPX |
| 5 | "40 loop" task overhead |
| 4200 | 42 time cost units per iteration of "40 loop" multiplied by estimated 100 iterations for N |
| 20 | deallocate memory |
| 4225 | Total time cost to execute modified "40 loop" task in parallel |
| 5 | "50 loop" task overhead |
| 1600 | 16 time cost units per iteration of "50 loop" multiplied by estimated 100 iterations for N |
| 1605 | Total time cost to execute "50 loop" task in parallel |

In accordance with methods and systems consistent with the present invention, the cost estimator 126 or the optimization tool 130 recognizes that the total run time cost that one would measure on a clock for parallel processing of the two tasks is the maximum or slowest of the two tasks. For example, the total run time cost=clock time=600+max(4225, 1605)=600+4225=4825 time cost units.

The cost estimator 126 or the optimization tool 130 is able to recognize, in this example, that the cost to implement and execute the transformed code of the program 122 (e.g., 4825 time cost units) is an improvement over the cost to execute the original code of the program 122 (e.g., 5810 time cost units). Thus, in accordance with methods and systems consistent with the present invention, the cost estimator 126 or the optimization tool 130 indicate to the compiler 112 to transform the "40 loop" task and the "50 loop" task for parallel processing when compiling these tasks for program 122.

As discussed in further detail below, the optimization tool 130 alone or in conjunction with the compiler 112 is operably configured to detect and avoid an address dependency between tasks in a program before execution of the tasks in order to improve the performance of the program.

The optimization tool 130 may comprise or may be included in one or more code sections containing instructions for performing respective operations. While the optimization tool 130 and other programs (e.g., compiler 112) are described as being implemented as software, the present implementation may be implemented as a combination of hardware and software or hardware alone. Also, one of skill in the art will appreciate that programs may comprise or may be included in a data processing device, which may be a server, communicating with data processing system 100.

In addition, although aspects of one implementation shown in FIG. 1 are depicted as being stored in memory, one skilled in the art will appreciate that all or part of systems and methods consistent with the present invention may be stored on or read from other computer-readable media, such as secondary storage devices, like hard disks, floppy disks, and CD-ROM; or other forms of ROM or RAM either currently known or later developed. Further, although specific components of data processing system 100 have been described, one skilled in the art will appreciate that a data processing system suitable for use with methods, systems, and articles of manufacture consistent with the present invention may contain additional or different components.

Figure 2A:
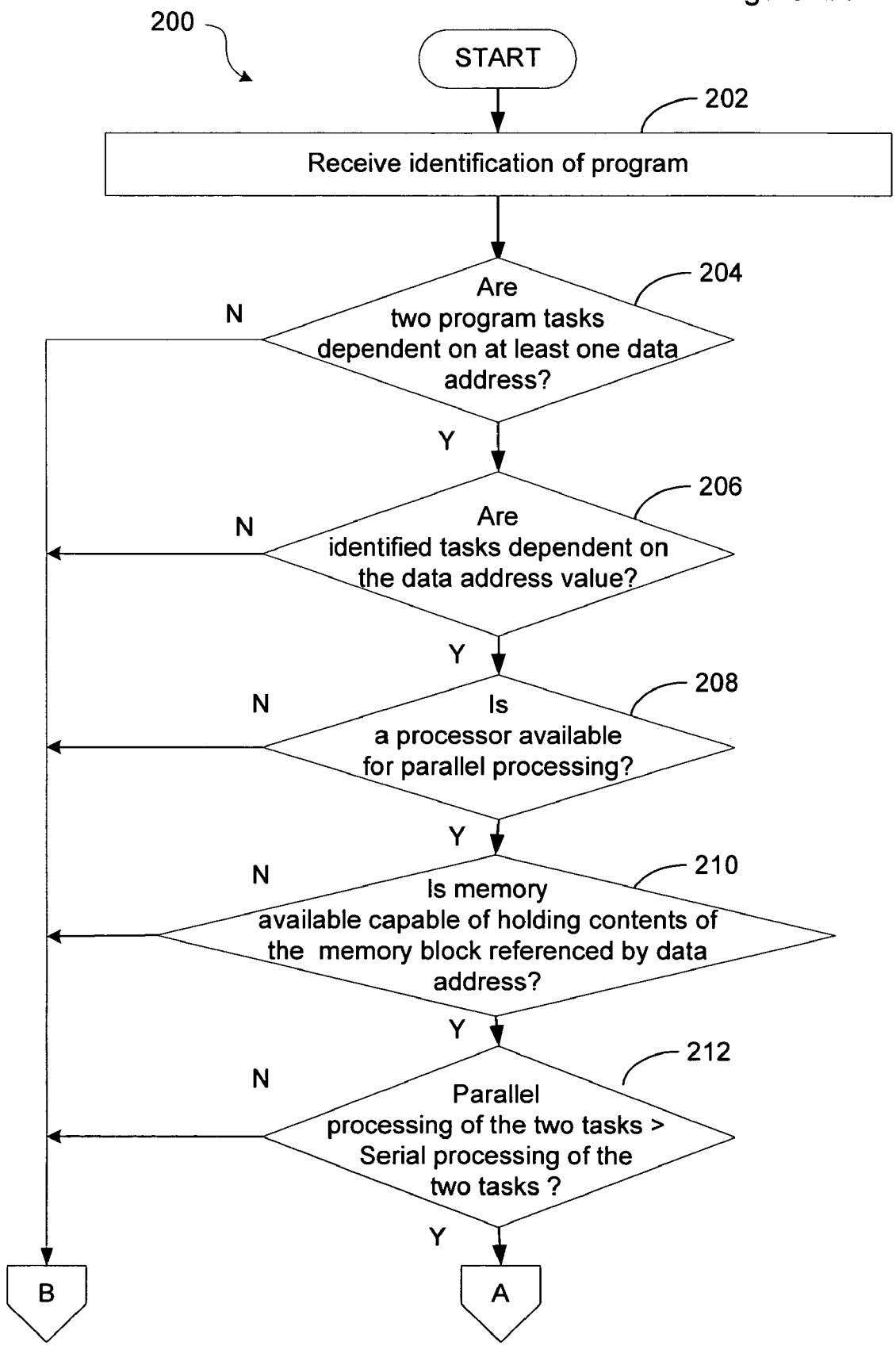

FIGS. 2A-2B depict a flow diagram illustrating an exemplary process 200 performed by the optimization tool 130 to detect and avoid an address dependency between tasks in a program in accordance with methods, systems, and articles of manufacture consistent with the present invention. Initially, the optimization tool 130 receives an identification of a program (step 202). For example, a user may identify program 122 to the optimization tool 130 using a data input technique, such as a mouse click on or keyboard entry of the program's name (not shown in figures). Alternatively, the optimization tool 130 may automatically receive the name of the program 124 via the compiler 112 when the user requests the compiler 112 to produce the program 122 from the source modules 114-116.

Next, the optimization tool 130 determines whether two or more tasks of the program are dependent on at least one same address (step 204). FIG. 3 depicts a flow diagram illustrating steps corresponding to the process shown in FIGS. 2A-2B as performed by the optimization tool on the exemplary program 122. In the implementation shown in FIG. 3, the optimization tool 130 is able to recognize that the original code 302 of the program 122 has three tasks 304, 306, and 308 that depend on a memory address 310 (e.g., address "X") that references a first memory block or array of "N" data addresses. In one implementation, the optimization tool 130 identifies the three tasks 304, 306, and 308 as being dependent on the address 310 by identifying that the "alias" table 124 produced by the compiler 112 for program 122 indicates a "does alias" or "might alias" relationship exists between the tasks 304, 306, and 308 that reference address 310 (data address X) to read or write to the first memory block. In another implementation, the optimization tool 130 identifies an address dependency among tasks by examining the source code modules 114-116 corresponding to original code 302 for any two tasks 304, 306, or 308 that reference the same memory address 310.

If two or more tasks of the program 122 are dependent on an address, the optimization tool 130 determines whether the two or more tasks are dependent on a value of the address (step 206). In the example shown in FIG. 3, by examining source modules 114-116 corresponding to original code 302, the optimization tool 130 is able to recognize that the task 306 ("40 loop" task) reads multiple addresses, including the memory address 310 (data address X), associated with the first memory block before writing the results of an addition operation using the values of the multiple to a printer or other physical I/O device 104. Thus, the optimization tool 130 is able to recognize that the two tasks 304 and 306 depend on the value of memory address 310. In a similar manner, the optimization tool 130 is able to recognize that the task 308 ("50 loop" task) does not depend on the value of memory address 310 as task 308 writes to memory address 310 without reading or referencing the contents of the memory address 310.

If two or more tasks are dependent on the value of the address, the optimization tool 130 determines whether a processor is available for parallel processing of the two or more tasks (step 208). Assessing the availability of a processor is the first of multiple steps that the optimization tool 130 is operably configured to perform (e.g., as part of the process "evaluate_utility" 312 in FIG. 3) to assess if it is useful to process the two or more tasks 306 and 308 in parallel. In one implementation, the optimization tool 130 uses system or kernel calls to the operating system 128 to identify the availability of CPU 102 or 103 for parallel processing. For example, the optimization tool 130 may perform the system call "getloadavg" to the kernel or operating system 111 as described in Appendix A, or other standard system or kernel statistic function calls to ascertain the load average in the system run queue for the CPU 102 and 103. Based on the load average of CPU 102 and 103, the optimization tool 130 is able to determine whether the processors 102 and 103 are able to undertake the additional processing of tasks 306 and 308 in parallel.

If a processor is available for parallel processing of the two or more tasks, the optimization tool 130 determines whether there is memory available capable of holding contents of the first memory block referenced by the address (step 210). Assessing the availability of memory is the second of multiple steps that the optimization tool 130 is operably configured to perform to assess if it is useful to process the two or more tasks 306 and 308 in parallel. In one implementation, the optimization tool 130 is able to ascertain whether there is available memory by determining whether an error or failure occurs (or a null pointer returned) when the tool tries to allocate a second memory block having a size (e.g., "N" addresses) equal to the first memory block referenced by the memory address 310 upon which tasks 306 and 308 both depend. Alternatively, the optimization tool 130 may perform a system call, such as "sysconf(_SC_AVPHYS_PAGES)" as described in Appendix B, to ascertain the number of physical memory blocks or pages not currently in use by the system 100.

If there is memory available, the optimization tool 130 determines whether the cost (e.g., the savings) of implementing and executing the two address dependent tasks 306 and 308 in parallel is greater than the cost of processing the two tasks in series (step 212). Comparing the total cost of processing the two tasks serially and the savings of processing the two tasks in parallel is the third of multiple steps that the optimization tool 130 is operably configured to perform (e.g., as part of the process "evaluate_utility" 312 in FIG. 3) to assess if it is useful to process the two or more tasks 306 and 308 in parallel. As described above, the optimization tool 120 alone, or via cost estimator 126, is able to calculate the total time cost of executing the two dependent tasks in the original code 302 (e.g., the "40 loop" task 306 and "50 loop" task 308 of FIG. 3) in series, to calculate the total time cost of implementing (e.g., memory allocation and reference changing operations 314 and 316 in FIG. 3) and executing the two tasks in the transformed code 318 and 320 (e.g., the modified "40 loop" task 322 and the "50 loop" task 308 of FIG. 3), and to compare the serial total cost to the parallel total cost to ascertain if it is useful to avoid the dependency between the tasks 306 and 308 in the original code 302. In the example shown in FIG. 3 and discussed above, the optimization tool 130 is able to recognize that the cost to implement and execute the transformed code 318 and 320 of the program 122 (e.g., 4825 time cost units) is an improvement over the cost to execute the original code 302 of the program 122 (e.g., 5810 time cost units).

If the cost (e.g., the savings) of implementing and executing the two address dependent tasks 306 and 308 in parallel is greater than the cost of processing the two tasks in series, the optimization tool allocates a new or second memory block capable of holding contents of the first memory block referenced by the address upon which the tasks depended (step 214). In one implementation, the optimization tool 130 performs the operations 314 and 316 in FIG. 3 (or inserts these operations into the transformed code 318 and 320 of the program 122) to create the temporary memory for avoiding the dependency on the address 310.

Next, the optimization tool 130 changes a read reference by at least one of the two tasks 306 and 308 from the first memory block associated with the address 310 to the second memory block (e.g., TEMP as allocated in operation 314) (step 216). In the example shown in FIG. 3, the optimization tool 130 changes the read references in the "40 loop" task 306 from the address 310 (data address X) to the second memory block referenced by "TEMP" to create the modified "40 loop" task 322.

The optimization tool 130 then runs or continues the execution of the program 122 (step 218). Next, the optimization tool 130 determines whether the task or tasks using the new or second memory block have completed (step 220). For example, the optimization tool 130 determines whether the modified "40 loop" task 322, which uses the new memory block referenced by TEMP, has completed. If the task or tasks using the new memory block have completed, the optimization tool 130 releases the new memory block (step 222). In the example shown in FIG. 3, the optimization tool 130 releases the new memory block referenced by TEMP after the "40 loop" task 322 has completed.

After releasing the new memory block or if the optimization tool 130 determines that it is not useful to process the two or more tasks 306 and 308 in parallel in steps 208, 210, or 212, then the optimization tool 130 ends processing.

The foregoing description of an implementation of the invention has been presented for purposes of illustration and description. It is not exhaustive and does not limit the invention to the precise form disclosed. Modifications and variations are possible in light of the above teachings or may be acquired from practicing the invention. For example, the described implementation includes software but the present implementation may be implemented as a combination of hardware and software or hardware alone. The invention may be implemented with both object-oriented and non-object-oriented programming systems. The scope of the invention is defined by the claims and their equivalents.

APPENDIX A

Standard C Library Functions            getloadavg(3C)
NAME
   getloadavg - get system load averages
SYNOPSIS
   #include <sys/loadavg.h>
   int getloadavg(double loadavg[ ], int nelem);
DESCRIPTION
   The getloadavg( ) function returns the number of processes in
   the system run queue averaged over various periods of time.
   Up to nelem samples are retrieved and assigned to successive
   elements of loadavg[ ]. The system imposes a maximum of 3
   samples, representing averages over the last 1, 5, and 15
   minutes, respectively.
   The LOADAVG_1MIN, LOADAVG_5MIN, and
   LOADAVG_15MIN indices, defined in <sys/loadavg.h>, can be
   used to extract the data from the appropriate element of the
   loadavg[ ] array.
RETURN VALUES
   Upon successful completion, the number of samples actually
   retrieved is returned. If the load average was unobtainable,
   −1 is returned and errno is set to indicate the error.
ERRORS
   The getloadavg( ) function will fail if:
EINVAL
   The number of elements specified is less than zero.
ATTRIBUTES
   See attributes(5) for descriptions of the following attributes:

| ATTRIBUTE TYPE | ATTRIBUTE VALUE |
|---|---|
| MT-Level | MT-Safe |

APPENDIX B

Standard C Library Functions            sysconf(3C)
NAME
   sysconf - get configurable system variables
SYNOPSIS
   #include <unistd.h>

APPENDIX B-continued

```
long sysconf(int name);
DESCRIPTION
    The sysconf( ) function provides a method for an application
    to determine the current value of a configurable system
    limit or option (variable).
    The _n_a_m_e argument represents the system variable to be
    queried. The following table lists the minimal set of system
    variables from <limits.h> and <unistd.h> that can be
    returned by sysconf( ) and the symbolic constants defined in
    <unistd.h> that are the corresponding values used for _n_a_m_e
    on the SPARC and IA platforms.
```

| Name | Return Value | Meaning |
| --- | --- | --- |
| _SC_2_C_BIND | _POSIX2_C_BIND | Supports the C language binding option |
| _SC_2_C_DEV | _POSIX2_C_DEV | Supports the C language development utilities option |
| _SC_2_C_VERSION | _POSIX2_C_VERSION | Integer value indicates version of ISO POSIX-2 standard (Commands) |
| _SC_2_CHAR_TERM | _POSIX2_CHAR_TERM | Supports at least one terminal |
| _SC_2_FORT_DEV | _POSIX2_FORT_DEV | Supports FORTRAN Development Utilities Option |
| _SC_2_FORT_RUN | _POSIX2_FORT_RUN | Supports FORTRAN Run-time Utilities Option |
| _SC_2_LOCALEDEF | _POSIX2_LOCALEDEF | Supports creation of locales by the localedef utility |
| _SC_2_SW_DEV | _POSIX2_SW_DEV | Supports Software Development Utility Option |
| _SC_2_UPE | _POSIX2_UPE | Supports User Portability Utilities Option |
| _SC_2_VERSION | _POSIX2_VERSION | Integer value indicates version of ISO POSIX-2 standard (C language binding) |
| _SC_AIO_LISTIO_MAX | AIO_LISTIO_MAX | Max number of I/O operations in a single list I/O call supported |
| _SC_AIO_MAX | AIO_MAX | Max number of outstanding asynchronous I/O operations supported |
| _SC_AIO_PRIO_DELTA_MAX | AIO_PRIO_DELTA_MAX | Max amount by which process can decrease its asynchronous I/O priority level from its own scheduling priority |
| _SC_ARG_MAX | ARG_MAX | Max size of argv[ ] plus envp[ ] |
| _SC_ASYNCHRONOUS_IO | _POSIX_ASYNCHRONOUS_IO | Supports Asynchronous I/O |
| _SC_ATEXIT_MAX | ATEXIT_MAX | Max number of functions that may be registered with atexit( ) |
| _SC_AVPHYS_PAGES | | Number of physical memory pages not currently in use by system |
| _SC_BC_BASE_MAX | BC_BASE_MAX | Maximum obase values allowed by bc |
| _SC_BC_DIM_MAX | BC_DIM_MAX | Max number of elements permitted in array by bc |
| _SC_BC_SCALE_MAX | BC_SCALE_MAX | Max scale value allowed by bc |

APPENDIX B-continued

| | | |
|---|---|---|
| _SC_BC_STRING_MAX | BC_STRING_MAX | Max length of string constant allowed by bc |
| _SC_CHILD_MAX | CHILD_MAX | Max processes allowed to a UID |
| _SC_CLK_TCK | CLK_TCK | Ticks per second (clock_t) |
| _SC_COLL_WEIGHTS_MAX | COLL_WEIGHTS_MAX | Max number of weights that can be assigned to entry of the LC_COLLATE order keyword in locale definition file |
| _SC_DELAYTIMER_MAX | DELAYTIMER_MAX | Max number of timer expiration overruns |
| _SC_EXPR_NEST_MAX | EXPR_NEST_MAX | Max number of parentheses by expr |
| _SC_FSYNC | _POSIX_FSYNC | Supports File Synchronization |
| _SC_GETGR_R_SIZE_MAX | NSS_BUFLEN_GROUP | Max size of group entry buffer |
| _SC_GETPW_R_SIZE_MAX | NSS_BUFLEN_PASSWD | Max size of password entry buffer |
| _SC_IOV_MAX | IOV_MAX | Max number of iovec structures available to one process for use with readv( ) and writev( ) |
| _SC_JOB_CONTROL | _POSIX_JOB_CONTROL | Job control supported? |
| _SC_LINE_MAX | LINE_MAX | Max length of input line |
| _SC_LOGIN_NAME_MAX | LOGNAME_MAX + 1 | Max length of login name |
| _SC_LOGNAME_MAX | LOGNAME_MAX | |
| _SC_MAPPED_FILES | _POSIX_MAPPED_FILES | Supports Memory Mapped Files |
| _SC_MEMLOCK | _POSIX_MEMLOCK | Supports Process Memory Locking |
| _SC_MEMLOCK_RANGE | _POSIX_MEMLOCK_RANGE | Supports Range Memory Locking |
| _SC_MEMORY_PROTECTION | _POSIX_MEMORY_PROTECTION | Supports Memory Protection |
| _SC_MESSAGE_PASSING | _POSIX_MESSAGE_PASSING | Supports Message Passing |
| _SC_MQ_OPEN_MAX | MQ_OPEN_MAX | Max number of open message queues a process may hold |
| _SC_MQ_PRIO_MAX | MQ_PRIO_MAX | Max number of message priorities supported |
| _SC_NGROUPS_MAX | NGROUPS_MAX | Max simultaneous groups to which one may belong |
| _SC_NPROCESSORS_CONF | | Number of processors configured |
| _SC_NPROCESSORS_ONLN | | Number of processors online |
| _SC_OPEN_MAX | OPEN_MAX | Max open files per process |
| _SC_PAGESIZE | PAGESIZE | System memory page size |
| _SC_PAGE_SIZE | PAGESIZE | Same as _SC_PAGESIZE |
| _SC_PASS_MAX | PASS_MAX | Max number of significant bytes in a password |
| _SC_PHYS_PAGES | | Total number of pages of physical memory in system |
| _SC_PRIORITIZED_IO | _POSIX_PRIORITIZED_IO | Supports Prioritized I/O |
| _SC_PRIORITY_SCHEDULING | _POSIX_PRIORITY_SCHEDULING | Supports Process Scheduling |

APPENDIX B-continued

| | | |
|---|---|---|
| _SC_RE_DUP_MAX | RE_DUP_MAX | Max number of repeated occurrences of a regular expression permitted when using interval notation \{m,n\} |
| _SC_REALTIME_SIGNALS | _POSIX_REALTIME_SIGNALS | Supports Realtime Signals |
| _SC_RTSIG_MAX | RTSIG_MAX | Max number of realtime signals reserved for application use |
| _SC_SAVED_IDS | _POSIX_SAVED_IDS | Saved IDs (seteuid( )) supported? |
| _SC_SEM_NSEMS_MAX | SEM_NSEMS_MAX | Max number of semaphores that a process may have |
| _SC_SEM_VALUE_MAX | SEM_VALUE_MAX | Max value a semaphore may have |
| _SC_SEMAPHORES | _POSIX_SEMAPHORES | Supports Semaphores |
| _SC_SHARED_MEMORY_OBJECTS | _POSIX_SHARED_MEMORY_OBJECTS | Supports Shared Memory Objects |
| _SC_SIGQUEUE_MAX | SIGQUEUE_MAX | Max number of queued signals that a process may send and have pending at receiver(s) at a time |
| _SC_STREAM_MAX | STREAM_MAX | Number of streams one process can have open at a time |
| _SC_SYNCHRONIZED_IO | _POSIX_SYNCHRONIZED_IO | Supports Synchronized I/O |
| _SC_THREAD_ATTR_STACKADDR | _POSIX_THREAD_ATTR_STACKADDR | Supports Thread Stack Address Attribute option |
| _SC_THREAD_ATTR_STACKSIZE | _POSIX_THREAD_ATTR_STACKSIZE | Supports Thread Stack Size Attribute option |
| _SC_THREAD_DESTRUCTOR_ITERATIONS | PTHREAD_DESTRUCTOR_ITERATIONS | Number attempts made to destroy thread-specific data on thread exit |
| _SC_THREAD_KEYS_MAX | PTHREAD_KEYS_MAX | Max number of data keys per process |
| _SC_THREAD_PRIO_INHERIT | _POSIX_THREAD_PRIO_INHERIT | Supports Priority Inheritance option |
| _SC_THREAD_PRIO_PROTECT | _POSIX_THREAD_PRIO_PROTECT | Supports Priority Protection option |
| _SC_THREAD_PRIORITY_SCHEDULING | _POSIX_THREAD_PRIORITY_SCHEDULING | Supports Thread Execution Scheduling option |
| _SC_THREAD_PROCESS_SHARED | _POSIX_THREAD_PROCESS_SHARED | Supports Process-Shared Synchronization option |
| _SC_THREAD_SAFE_FUNCTIONS | _POSIX_THREAD_SAFE_FUNCTIONS | Supports Thread-Safe Functions option |
| _SC_THREAD_STACK_MIN | PTHREAD_STACK_MIN | Min byte size of thread stack storage |
| _SC_THREAD_THREADS_MAX | PTHREAD_THREADS_MAX | Max number of threads per process |
| _SC_THREADS | _POSIX_THREADS | Supports Threads option |
| _SC_TIMER_MAX | TIMER_MAX | Max number of timer per process supported |
| _SC_TIMERS | _POSIX_TIMERS | Supports Timers |
| _SC_TTY_NAME_MAX | TTYNAME_MAX | Max length of tty device name |
| _SC_TZNAME_MAX | TZNAME_MAX | Max number of bytes supported for name of a time zone |
| _SC_VERSION | _POSIX_VERSION | POSIX.1 version supported |

APPENDIX B-continued

| | | |
|---|---|---|
| _SC_XBS5_ILP32_OFF32 | _XBS_ILP32_OFF32 | Indicates support for X/Open ILP32 w/32-bit offset build environment |
| _SC_XBS5_ILP32_OFFBIG | _XBS5_ILP32_OFFBIG | Indicates support for X/Open ILP32 w/64-bit offset build environment |
| _SC_XBS5_LP64_OFF64 | _XBS5_LP64_OFF64 | Indicates support of X/Open LP64, 64-bit offset build environment |
| _SC_XBS5_LPBIG_OFFBIG | _XBS5_LP64_OFF64 _SC_XBS5_LP64_OFF64 | Same as |
| _SC_XOPEN_CRYPT | _XOPEN_CRYPT | Supports X/Open Encryption Feature Group |
| _SC_XOPEN_ENH_I18N | _XOPEN_ENH_I18N | Supports X/Open Enhanced Internationalization Feature Group |
| _SC_XOPEN_LEGACY | _XOPEN_LEGACY | Supports X/Open Legacy Feature Group |
| _SC_XOPEN_REALTIME | _XOPEN_REALTIME | Supports X/Open POSIX Realtime Feature Group |
| _SC_XOPEN_REALTIME_THREADS | _XOPEN_REALTIME_THREADS | Supports X/Open POSIX Realtime Threads Feature Group |
| _SC_XOPEN_SHM | _XOPEN_SHM | Supports X/Open Shared Memory Feature Group |
| _SC_XOPEN_UNIX | _XOPEN_UNIX | Supports X/Open CAE Specification, August 1994, System Interfaces and Headers, Issue 4, Version 2 |
| _SC_XOPEN_VERSION | _XOPEN_VERSION | Integer value indicates version of X/Open Portability Guide to which implementation conforms |
| _SC_XOPEN_XCU_VERSION | _XOPEN_XCU_VERSION | Integer value indicates version of XCU specification to which implementation conforms |

RETURN VALUES
Upon successful completion, sysconf( ) returns the current variable value on the system. The value returned will not be more restrictive than the corresponding value described to the application when it was compiled with the implementation's <limits.h>, <unistd.h> or <time.h>. The value will not change during the lifetime of the calling process.
If _n_a_m_e is an invalid value, sysconf( ) returns −1 and sets errno to indicate the error. If the variable corresponding to _n_a_m_e is associated with functionality that is not supported by the system, sysconf( ) returns −1 without changing the value of _e_r_r_n_o.
Calling sysconf( ) with the following returns −1 without setting errno, because no maximum limit can be determined. The system supports at least the minimum values and can support higher values depending upon system resources.

| Variable | Minimum supported value |
|---|---|
| _SC_AIO_MAX | _POSIX_AIO_MAX |
| _SC_THREAD_THREADS_MAX | _POSIX_THREAD_THREADS_MAX |
| _SC_THREAD_KEYS_MAX | _POSIX_THREAD_KEYS_MAX |
| _SC_THREAD_DESTRUCTOR_ITERATIONS | _POSIX_THREAD_DESTRUCTOR_ITERATIONS |

The following SPARC and IA platform variables return EINVAL:

| | |
|---|---|
| _SC_COHER_BLKSZ | _SC_DCACHE_ASSOC |
| _SC_DCACHE_BLKSZ | _SC_DCACHE_LINESZ |
| _SC_DCACHE_SZ | _SC_DCACHE_TBLKSZ |
| _SC_ICACHE_ASSOC | _SC_ICACHE_BLKSZ |

APPENDIX B-continued

```
        _SC_ICACHE_LINESZ        _SC_ICACHE_SZ
        _SC_SPLIT_CACHE
ERRORS
    The sysconf( ) function will fail if:
    EINVAL
        The value of the _n_a_m_e argument is invalid.
ATTRIBUTES
    See attributes(5) for descriptions of the following attri-
    butes:
```

| ATTRIBUTE TYPE | ATTRIBUTE VALUE |
|---|---|
| Architecture | SPARC and IA |
| MT-Level | MT-Safe, Async-Signal-Safe |

```
SEE ALSO
    fpathconf(2), seteuid(2), setrlimit(2), attributes(5), stan-
    dards(5)
NOTES
    A call to setrlimit( ) may cause the value of OPEN_MAX to
    change.
    Multiplying sysconf(_SC_PHYS_PAGES) or
    sysconf(_SC_AVPHYS_PAGES) by sysconf(_SC_PAGESIZE) to deter-
    mine memory amount in bytes can exceed the maximum values
    representable in a long or unsigned long.
    The value of CLK_TCK may be variable and it should not be
    assumed that CLK_TCK is a compile-time constant.
    The _SC_PHYS_PAGES and _SC_AVPHYS_PAGES variables are
    specific to Solaris 2.3 or compatible releases.
```

What is claimed is:

1. A method in a data processing system for avoiding an address dependency between tasks coded in source code for a program to be executed in the data processing system, comprising the steps of:

determining whether two or more tasks of the same program have been coded in source code to depend on at least one same memory address, the at least one same memory address being associated with a first memory block;

when it is determined that the two or more tasks of the program have been coded in source code to depend on the at least one same memory address, allocating a second memory block; and changing a read reference by at least one of the two or more tasks from the first memory block associated with the at least one same memory address to the second memory bloc; and determining whether it is useful to process the two or more tasks in parallel by:

identifying a cost associated with processing the two or more tasks in series;

identifying a savings associated with processing the two or more tasks in parallel;

determining whether the savings is greater than the cost; and identifying that it is useful to process the two or more tasks in parallel in response to determining that the savings is greater than the cost;

wherein the steps of allocating and changing further comprise, when it is determined that it is useful to process the two or more tasks in parallel, allocating the second memory; and changing a read reference by at least one of the two or more tasks from the first memory block to the second memory block.

2. The method of claim 1, wherein:

the step of determining whether two or more tasks have been coded to depend on at least one same memory address comprises determining whether the two or more tasks of the program are not dependent on a value of the at least one same memory address, and the steps of allocating and changing further comprise, when it is determined that the two or more tasks of the program are not dependant on the value of the at least one same memory address, allocating the second memory block; and changing the read reference by at least one of the two or more tasks from the first memory block to the second memory block.

3. The method of claim 1, the step of identifying the savings further comprises calculating a first time associated with the step of allocating the second memory and the step of changing the read reference.

4. The method of claim 1, the step of identifying the savings further comprises:

calculating a respective time for performing each of the two or more tasks in parallel;

and associating the savings with a lowest of the calculated times for performing each of the two or more tasks in parallel.

5. The method of claim 1, wherein the step of determining whether it is useful to process further comprises:

determining whether one or more processors are available for performing the two or more tasks in parallel; and identifying that it is useful to process the two or more tasks in parallel in response to determining that the one or more processors are available for performing the tasks in parallel.

6. The method of claim 1, wherein the step of determining whether it is useful to process further comprises:
    determining whether the second memory block is available; and
    identifying that it is useful to process the two or more tasks in parallel in response to determining that the second memory block is available.

7. The method of claim 1, further comprising:
    running the program;
    determining whether the at least one of the two or more tasks has completed; and
    releasing the second memory block.

8. A computer-readable medium containing instructions for controlling a data processing system to perform a method for avoiding an address dependency between tasks coded in source code for a program to be executed in the data processing system, the method comprising the steps of:
    determining whether two or more tasks of the same program have been coded in source code to depend on at least one same memory address, the at least one same memory address being associated with a first memory block;
    when it is determined that the two or more tasks of the same program have been coded in source code to depend on the at least one same memory address,
    allocating a second memory block; and
    changing a read reference by at least one of the two or more tasks from the first memory block associated with the at least one same memory address to the second memory block; and
    determining whether it is useful to process the two or more tasks in parallel by:
        identifying a cost associated with processing the two or more tasks in series;
        identifying a savings associated with processing the two or more tasks in parallel;
        determining whether the savings is greater than the cost; and
        identifying that it is useful to process the two or more tasks in parallel in response to determining that the savings is greater than the cost; and
    wherein the steps of allocating and changing further comprise, when it is determined that it is useful to process the two or more tasks in parallel, allocating the second memory block; and changing a read reference by at least one of the two or more tasks from the first memory block to the second memory block.

9. The computer-readable medium of claim 8, wherein:
    the step of determining further comprises determining whether the two or more tasks of the program are not dependent on a value of the at least one same memory address, and
    the steps of allocating and changing further comprise, when it is determined that the two or more tasks of the program are not dependant on the value of the at least one same memory address, allocating the second memory block; and changing the read reference by at least one of the two or more tasks from the first memory block to the second memory block.

10. The computer-readable medium of claim 8, the step of identifying the cost further comprises calculating a first time associated with the step of allocating the second memory and the step of changing the read reference.

11. The computer-readable medium of claim 8, the step of identifying the savings further comprises:
    calculating a respective time for performing each of the two or more tasks in parallel;
    and associating the savings with a lowest of the calculated times for performing each of the two or more tasks in parallel.

12. The computer-readable medium of claim 8, wherein the step of determining whether it is useful to process further comprises:
    determining whether one or more processors are available for performing the two or more tasks in parallel; and
    identifying that it is useful to process the two or more tasks in parallel in response to determining that the one or more processors are available for performing the tasks in parallel.

13. The computer-readable medium of claim 8, wherein the step of determining whether it is useful to process further comprises:
    determining whether the second memory block is available; and
    identifying that it is useful to process the two or more tasks in parallel in response to
    determining that the second memory block is available.

14. The computer-readable medium of claim 13, further comprising:
    running the program;
    determining whether the at least one of the two or more tasks has completed; and
    releasing the second memory block.

15. A data processing system, comprising:
    a memory device further comprising a optimization program that determines whether two or more tasks of the same program have been coded in source code to depend on at least one same memory address, the at least one same memory address associated with a first memory block; when it is determined that the two or more tasks of the same program have been coded in source code to depend on the at least one same memory address, allocates a second memory block; and changes a read reference by at least one of the two or more tasks from the first memory block associated with the at least one same memory address to the second memory block; determining whether it is useful to process the two or more tasks in parallel by identifying a cost associated with processing the two or more tasks in series, identifying a savings associated with processing the two or more tasks in parallel, determining whether the savings is greater than the cost, and identifying that it is useful to process the two or more tasks in parallel in response to determining that the savings is greater than the cost; wherein allocating and changing further comprise, when it is determined that it is useful to process the two or more tasks in parallel, allocating the second memory block, and changing a read reference by at least one of the two or more tasks from the first memory block to the second memory block; and
    a processor that runs the optimization program.

16. The data processing system of claim 15, wherein:
    the step of determining further comprises determining whether the two or more tasks of the program are not dependent on a value of the at least one same memory address, and
    the steps of allocating and changing further comprise, when it is determined that the two or more tasks of the program are not dependant on the value of the at least one same memory address, allocating the second memory block; and changing the read reference by at least one of the two or more tasks from the first memory block to the second memory block.

17. The data processing system of claim 15, the step of identifying the cost further comprises calculating a first time associated with the step of allocating the second memory and the step of changing the read reference.

18. The data processing system of claim 15, the step of identifying the savings further comprises:
  calculating a respective time for performing each of the two or more tasks in parallel; and
  associating the savings with a lowest of the calculated times for performing each of the two or more tasks in parallel.

19. The data processing system of claim 15, wherein the step of determining whether it is useful to process further comprises:
  determining whether one or more processors are available for performing the two or more tasks in parallel; and
  identifying that it is useful to process the two or more tasks in parallel in response to determining that the one or more processors are available for performing the tasks in parallel.

20. The data processing system of claim 15, wherein the step of determining whether it is useful to process further comprises:
  determining whether the second memory block is available; and
  identifying that it is useful to process the two or more tasks in parallel in response to determining that the second memory block is available.

21. The data processing system of claim 15, further comprising:
  running the program;
  determining whether the at least one of the two or more tasks has completed; and
  releasing the second memory block.

22. A system, comprising:
  means for determining whether two or more tasks of a same program have been coded in source code to depend on at least one same memory address, the at least one same memory address associated with a first memory block; and
  means for allocating a second memory block; and changing a read reference by at least one of the two or more tasks from the first memory block associated with the at least one same memory address to the second memory block in response to determining that the two or more tasks of the same program have been coded in source code to depend on at least one same memory address; and means for determining whether it is useful to process the two or more tasks in parallel by means for identifying a cost associated with processing the two or more tasks in series; means for identifying a savings associated with processing the two or more tasks in parallel; means for determining whether the savings is greater than the cost; and means for identifying that it is useful to process the two or more tasks in parallel in response to determining that the savings is greater than the cost; wherein the means for allocating and changing further comprises allocating the second memory block; and changing the read reference by at least one of the two or more tasks from the first memory block to the second memory block in response to determining that it is useful to process the two or more tasks in parallel.

23. The system of claim 22, wherein:
  the means for determining further comprises means for determining whether the two or more tasks of the program are not dependent on a value of the at least one same memory address, and
  the means for allocating and changing further comprises means for allocating the second memory block; and for changing the read reference by at least one of the two or more tasks from the first memory block to the second memory block in response to determining that the two or more tasks of the program are not dependant on the value of the at least one same memory address.

24. The system of claim 22, the means for identifying the cost further comprises means for calculating a first time associated with the step of allocating the second memory and the step of changing the read reference.

25. The system of claim 22, the means for identifying the savings further comprises:
  means for calculating a respective time for performing each of the two or more tasks in parallel; and
  means for associating the savings with a lowest of the calculated times for performing each of the two or more tasks in parallel.

26. The system of claim 22, wherein the means for determining whether it is useful to process further comprises:
  means for determining whether one or more processors are available for performing the two or more tasks in parallel; and
  means for identifying that it is useful to process the two or more tasks in parallel in response to determining that the one or more processors are available for performing the tasks in parallel.

27. The system of claim 22, wherein means for determining whether it is useful to process further comprises:
  means for determining whether the second memory block is available; and
  means for identifying that it is useful to process the two or more tasks in parallel in response to determining that the second memory block is available.

28. The system of claim 22, further comprising:
  means for running the program;
  means for determining whether the at least one of the two or more tasks has completed; and
  means for releasing the second memory block.

* * * * *

UNITED STATES PATENT AND TRADEMARK OFFICE
CERTIFICATE OF CORRECTION

| | |
|---|---|
| PATENT NO. | : 7,725,643 B1 |
| APPLICATION NO. | : 10/838385 |
| DATED | : May 25, 2010 |
| INVENTOR(S) | : Boucher |

Page 1 of 1

It is certified that error appears in the above-identified patent and that said Letters Patent is hereby corrected as shown below:

Column 21, line 50, delete "bloc" and insert therefor --block--.

Signed and Sealed this

Thirteenth Day of July, 2010

David J. Kappos
*Director of the United States Patent and Trademark Office*